(12) United States Patent
Daneshvar et al.

(10) Patent No.: US 10,007,531 B2
(45) Date of Patent: Jun. 26, 2018

(54) SYSTEM, METHOD, AND RECORDING MEDIUM FOR ADAPTIVE INTERFACE FOR ILLITERATE

(71) Applicant: International Business Machines Corporation, Armonk, NY (US)

(72) Inventors: Roozbeh Daneshvar, Briarcliff Manor, NY (US); Elham Khabiri, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 15/056,541

(22) Filed: Feb. 29, 2016

(65) Prior Publication Data
US 2017/0249168 A1    Aug. 31, 2017

(51) Int. Cl.
*G06F 3/00* (2006.01)
*G06F 9/44* (2018.01)
*G06F 3/0481* (2013.01)
*G06F 3/0482* (2013.01)

(52) U.S. Cl.
CPC .......... *G06F 9/4443* (2013.01); *G06F 3/0482* (2013.01); *G06F 3/04817* (2013.01)

(58) Field of Classification Search
CPC ... G06F 9/4443; G06F 3/04817; G06F 3/0482
See application file for complete search history.

(56) References Cited

U.S. PATENT DOCUMENTS

| | | | |
|---|---|---|---|
| 6,505,208 B1 | 1/2003 | Kanevsky et al. | |
| 7,603,621 B2 | 10/2009 | Toyama et al. | |
| 7,805,309 B2 | 9/2010 | Carpenter | |
| 2002/0057298 A1* | 5/2002 | Wassom | G06F 3/0481 715/825 |

(Continued)

OTHER PUBLICATIONS

Huenerfauth,."Design Approaches for Developing User-Interfaces Accessible to Illiterate Users," Intelligent and Situation-Aware Media and Presentations Workshop. American Association of Artificial interlligence (AAA(2002) Conference, Edmonton, Alberta Canada (2002).

(Continued)

*Primary Examiner* — Omar Abdul-Ali
(74) *Attorney, Agent, or Firm* — Yeen Tham, Esq.; McGinn IP Law Group, PLLC

(57) ABSTRACT

An illiteracy method, system, and non-transitory computer readable medium for receiving a user input via an adaptive interface device including a display, include a pattern detection and evaluation circuit configured to detect and evaluate a pattern of the user input selections of an icon of a plurality of icons on a main-display interface of the display, a cognitive level estimation circuit configured to estimate a cognitive level of a user based on the pattern, an interface design determination circuit configured to determine an interface design out of a plurality of interface designs stored in a database results in a highest value of the cognitive level of the user, and a design updating circuit configured to update the main-display interface according to the interface design having the highest value of the cognitive level of the user.

20 Claims, 10 Drawing Sheets

(56) References Cited

U.S. PATENT DOCUMENTS

2005/0273778 A1* 12/2005 Bixler .................. G06F 3/0481
717/165
2015/0017965 A1* 1/2015 Lim .................. H04W 52/0258
455/418

OTHER PUBLICATIONS

Medhi et al., "Text-free user interfaces for illiterate and semi-literate users." Information and Communication Technologies and Development, 2006. ICTD'06. International Conference on, IEEE, 2006.
Martinez et al. "AGILE Interface for 'No-Learning nor Experience Required' Interaction." User Modeling and Adaptation for Daily Routines. Springer London, 2013. 119-151.
Hewitt et al., "On designing for usability: an application of four key principles." ACM SIGCHI Bulletin 17.4 (1986): 247-252.
Prasad et al. "Exploring the feasibility of video mail for illiterate users." Proceedings of the working conference on Advanced visual interfaces. ACM, 2008.
Tektonidis et al. "Intuitive user interfaces to help boost adoption of internet-of-things and internet-of-content services for all." Intercooperative Collective Intelligence: Techniques and Applications. Springer Berlin Heidelberg, 2014. 93-110.

* cited by examiner

SYSTEM, METHOD, AND RECORDING MEDIUM FOR ADAPTIVE INTERFACE FOR ILLITERATE

BACKGROUND

The present invention relates generally to a system for the illiterate, and more particularly, but not by way of limitation, to a system, method, and recording medium that enables illiterate people to interact with computer and internet services, for the purpose of increased engagement via creating and receiving worthy information to/from their community.

Conventional techniques for the illiterate include icon pictures that are detailed enough that they do not need text to be understood. Further, the icons in the conventional technique do not require that they be clicked to be selected, rather they select on cursor hover. When an icon is hovered over, it increases in size to make it easier for a user to select it. The interface has a help function that provides a voice that tells the function of an icon when the icon is "moused" over or otherwise tentatively chosen by a user.

Other conventional techniques consider a means for training users of computing systems to improve the efficiency of computer interactions by comparing trainee's actions with actions by other users performing similar tasks, and informing said trainee of said other users' more efficient techniques.

However, there are technical problems in the conventional techniques that the conventional techniques can improve efficiency of a system but does not consider how to find the most appropriate interface, by adapting the interface on an individual basis, to be operated by illiterates through understandable knowledge representation that is learned from user interaction with the system. Also, the conventional techniques are deficient in that the conventional techniques design a single icon without considering significantly more of at least a framework that could be used by illiterates to giving and getting services to their community through computer and internet.

That is, the inventors have recognized that there is a problem that illiterate people, no matter what their native country, cannot get access to basic necessities in society such as knowing the cost of products they produce, understanding debt, reporting crime, etc. Accordingly, the inventors have recognized that providing an adaptive interface having picture icons associated with each type of necessity such that the users can recognize can increase the likelihood that even illiterate people can function within a society. In other words, the adaptive interface represents each function in society using, for example, an icon having a pictorial representation for that function and then the sub-display interface pictorially displays to the user the type of function in several different ways. Thus, by having a database with a plurality of different interface designs and pictorial representations for each icon (i.e., multiple pictures representation the same function), the inventors have recognized that the interface can be adapted to each user based on a cognitive level of the user. The personalization is done not only at the main-interface level with the icons but on the sub-interface level by making the representation of the function in society that the user understands be the first to be displayed after an icon is selected.

SUMMARY

In an exemplary embodiment, the present invention can provide an illiteracy system for receiving a user input via an adaptive interface device including a display, the illiteracy system including a pattern detection and evaluation circuit configured to detect and evaluate a pattern of the user input selections of an icon of a plurality of icons on a main-display interface of the display, a cognitive level estimation circuit configured to estimate a cognitive level of a user based on the pattern, an interface design determination circuit configured to determine an interface design out of a plurality of interface designs stored in a database results in a highest value of the cognitive level of the user, and a design updating circuit configured to update the main-display interface according to the interface design having the highest value of the cognitive level of the user.

Further, in another exemplary embodiment, the present invention can provide an illiteracy method for receiving a user input via an adaptive interface device including a display, the illiteracy method including detecting and evaluating a pattern of the user input selections of an icon of a plurality of icons on a main-display interface of the display, estimating a cognitive level of a user based on the pattern, determining an interface design out of a plurality of interface designs stored in a database results in a highest value of the cognitive level of the user, and updating the main-display interface according to the interface design having the highest value of the cognitive level of the user.

Even further, in another exemplary embodiment, the present invention can provide a non-transitory computer-readable recording medium recording an illiteracy program for receiving a user input via an adaptive interface device including a display, the program causing a computer to perform: detecting and evaluating a pattern of the user input selections of an icon of a plurality of icons on a main-display interface of the display, estimating a cognitive level of a user based on the pattern, determining an interface design out of a plurality of interface designs stored in a database results in a highest value of the cognitive level of the user, and updating the main-display interface according to the interface design having the highest value of the cognitive level of the user.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
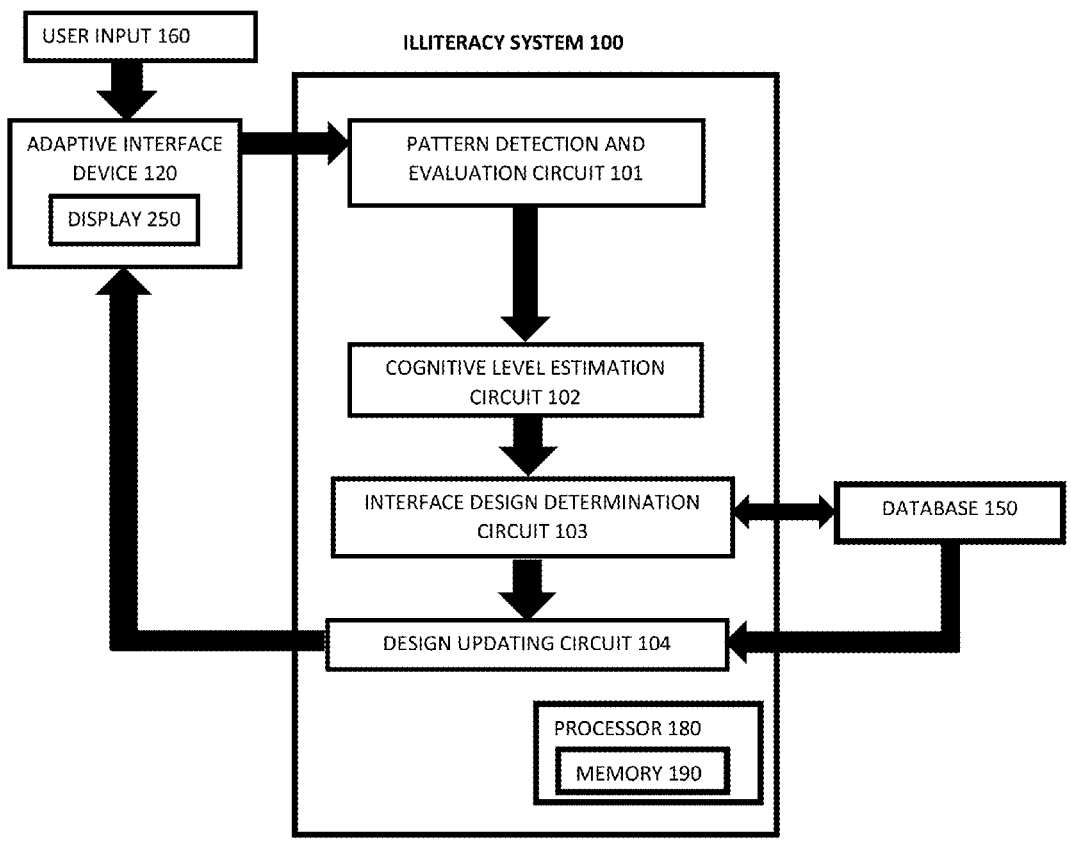
FIG. 1 exemplarily shows a block diagram illustrating a configuration of an illiteracy system 100.

The invention will now be described with reference to FIGS. 1-15, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the illiteracy system 100 includes a pattern detection and evaluation circuit 101, a cognitive level estimation circuit 102, an interface design determination circuit 103, and a design updating circuit 104. The illiteracy system 100 includes a processor 180 and a memory 190, with the memory 190 storing instructions to cause the processor 180 to execute each circuit of illiteracy system 100.

Although the illiteracy system 100 includes various circuits, it should be noted that an illiteracy system can include modules in which the memory 190 stores instructions to cause the processor 180 to execute each module of illiteracy system 100.

Also, each circuit can instead be made of a stand-alone device, unit, etc. that can be interconnected to cooperatively produce a transformation to a result.

Figure 12:
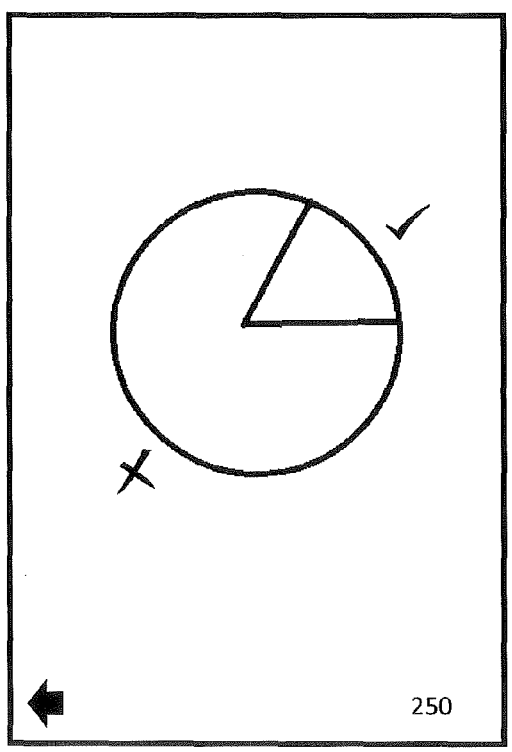
FIG. 12 exemplarily shows a third UI for loan monitoring showing a user an amount of debt paid versus amount of debt owed.
Figure 13:
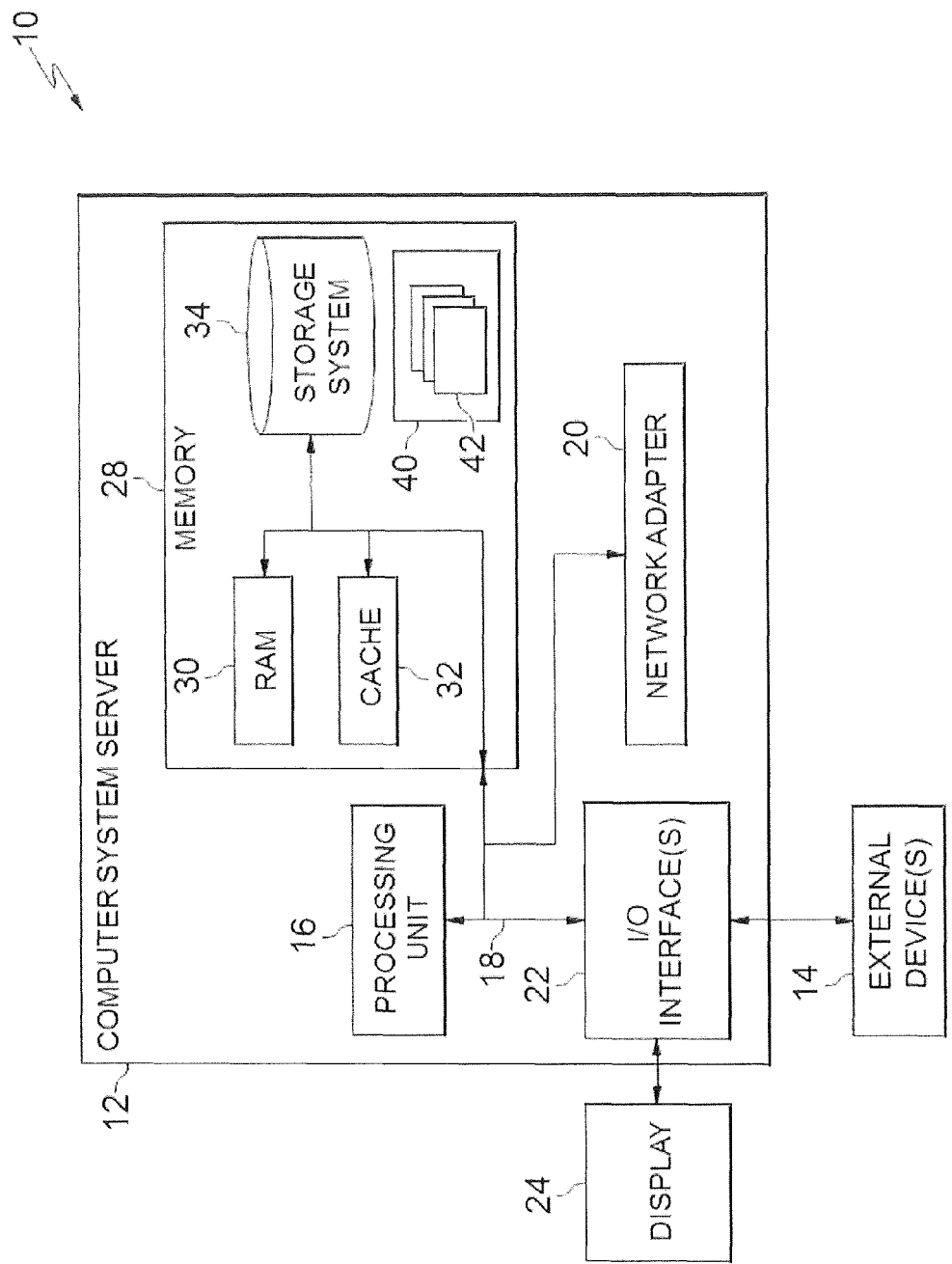
FIG. 13 depicts a cloud computing node according to an embodiment of the present invention.
Figure 14:
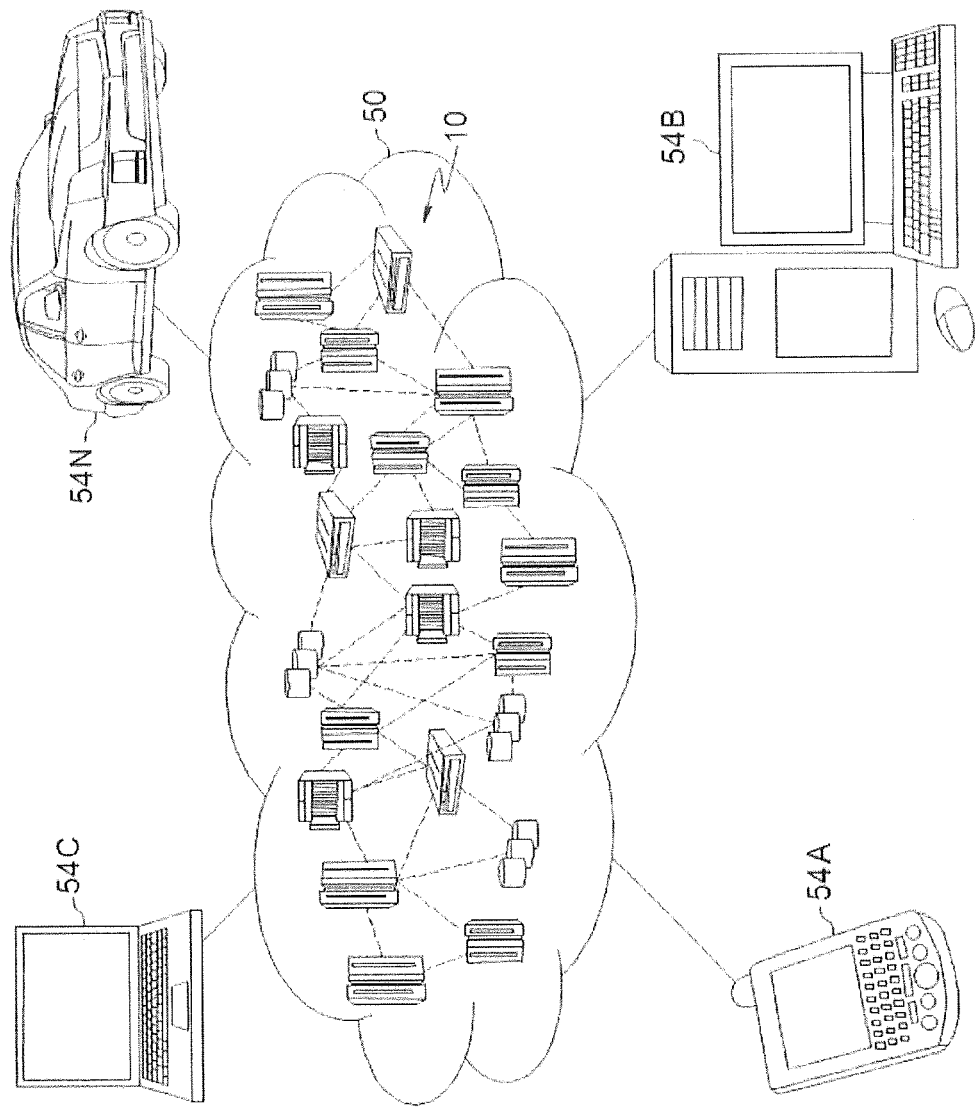
FIG. 14 depicts a cloud computing environment according to another embodiment of the present invention.
Figure 15:
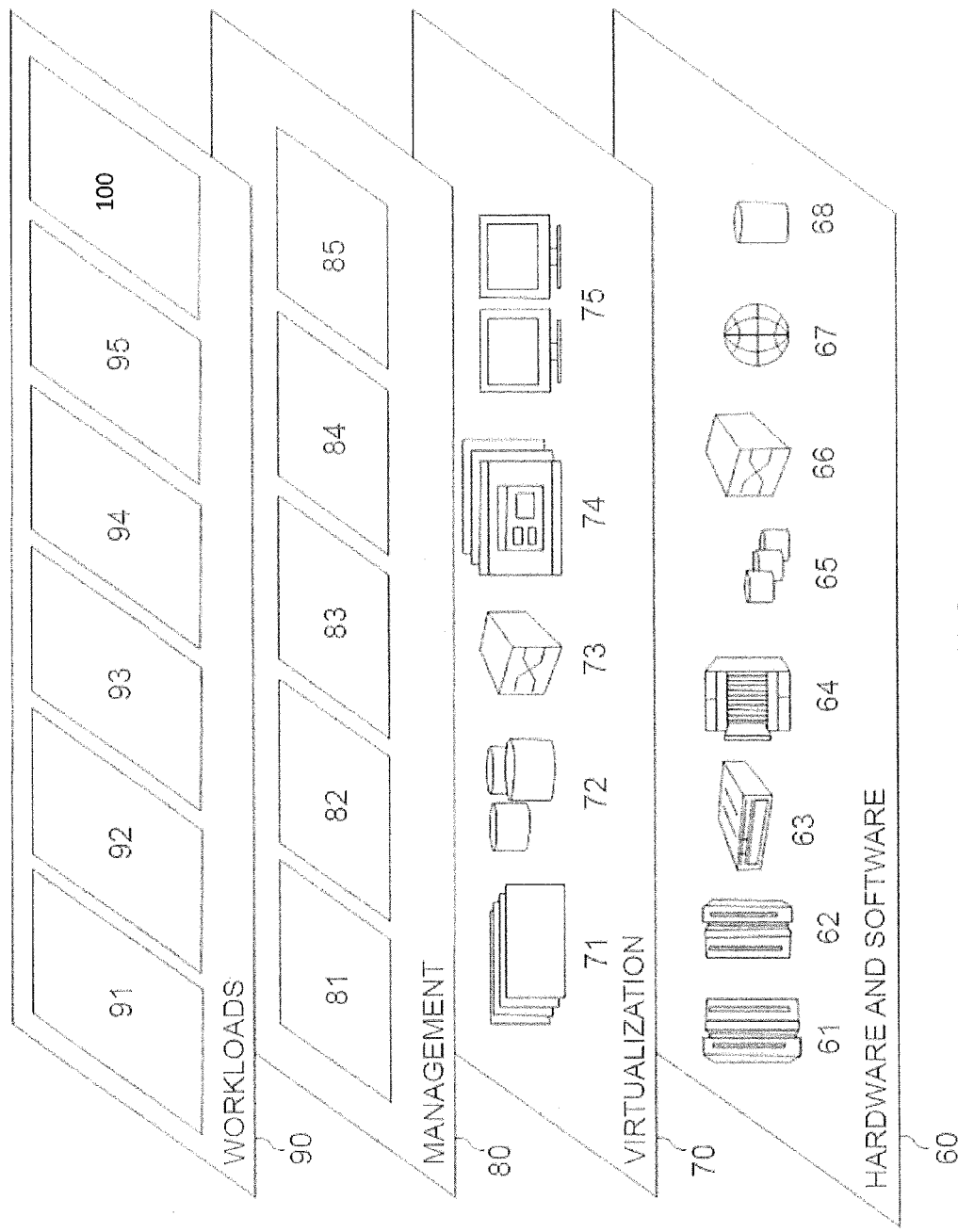
FIG. 15 depicts abstraction model layers according to an embodiment of the present invention.

Although as shown in FIGS. 13-15 and as described later, the computer system/server 12 is exemplarily shown in cloud computing node 10 as a general-purpose computing circuit which may execute in a layer the illiteracy system 100 (FIG. 12), it is noted that the present invention can be implemented outside of the cloud environment.

With the use of these various devices, the illiteracy system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties such as any of perception, goal-oriented behavior, learning/memory and action that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging devices, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive states over that period of time. One or more preferred embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

An adaptive interface device 120 including a display 250 receives a user input 160 selecting an icon, option, picture, etc. displayed on the display 250. The adaptive interface device 120 can be a smart phone, a tablet, a personal device, a lap top, etc. The adaptive interface device 120 preferably includes a means to sync with a database 150 at least initially. However, the adaptive interface device 120 can be pre-loaded with the illiteracy system 100 and receive updates via loading data thereto.

Figure 3:
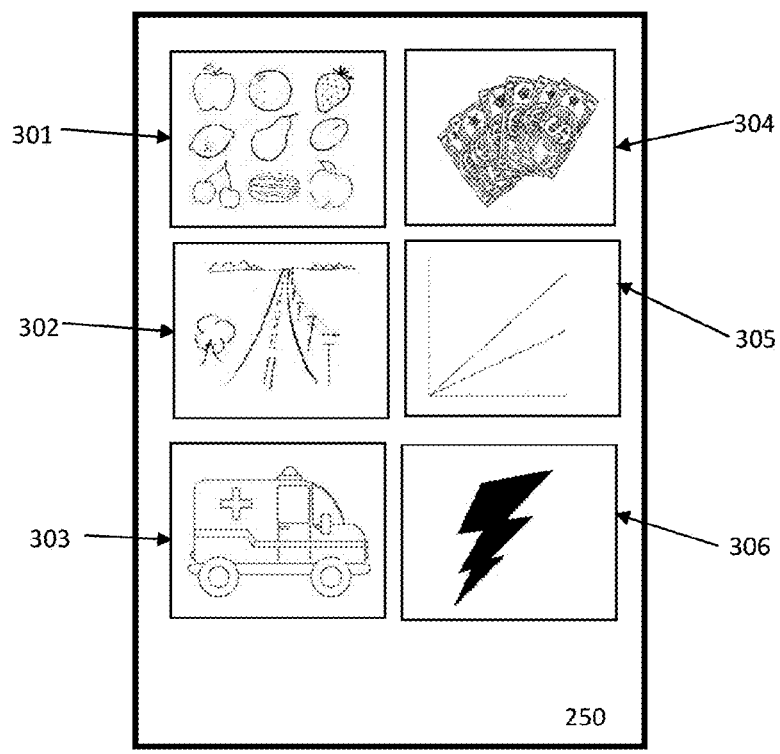
FIG. 3 exemplarily shows a first User Interface (UI) for the landing page showing multiple available applications.

The adaptive interface device 120 displays an initial interface design from the database 150 on the display 250 as exemplarily shown in FIG. 3.

FIG. 3 shows a first User Interface (UI) for the landing page showing multiple available applications on the display 250. FIG. 3 shows a plurality of icons including a "product" icon 301, a "civil services" icon 302, an "emergency service" icon 303, a "debt visualization" icon 304, a "stock market" icon 305, and a "power outage" icon 306. It is noted that the icons are merely exemplarily and not limited to six. That is, the initial display can display a plurality of icons from the database 150 depending on the preconfigured adaptive interface 120 settings.

Based on the user input 160, the pattern detection and evaluation circuit 101 detects the user inputs and evaluates if there is a pattern between the user input 160 and past user inputs 160. In other words, the pattern detection and evaluation circuit 101 detects if a pattern exists between selections by the user. For example, if a user continuously selects icon 301 but has never selected icon 305, the pattern detection and evaluate circuit 101 will detect this pattern.

Based on the evaluation of the user input 160 by the pattern detection and evaluation circuit 101, the cognitive level estimation circuit 102 estimates a cognition level of the user. The cognition level is an evaluation of what the user is able to understand. In other words, tendency to select a specific icon, or even the number of times the user could use specific features of the system correctly (e.g., correctly report civic concerns to the authority or correctly call emergency services), are used to determine the user's ability to understand (i.e., cognition level) the interface of the display 250.

The cognitive level of the user can be determined by many inputs (i.e., clues) that the user implicitly provides the cognitive level estimation. Generally speaking, the usage pattern is the preferred clue. In particular, the order of gestures, the actions of user vs. the expected actions from the user at that state (or the probability of specific actions expected from the user), the physical gestures and poses from the user while interacting with the device (such as position and orientation of the device, perceived through various built-in sensors in the device), analysis of temporal user interactions (e.g. the time delays between actions), etc. are other preferable hints about the user to determine the cognitive level.

According to the cognition level estimated by the cognitive level estimation circuit 102, the interface design determination circuit 103 determines which design out of the pool of available designs stored in the database 150 have been most successful, or, which design out of the pool of available designs stored in the database 150 would be most successful if the display 250 was updated according to the cognition level.

According to the design of the pool of available designs in the database 150 determined to be best for the user, the design updating circuit 104 updates the display 250 of the adaptive interface device 120 to display a better design for the user based on the cognition level.

Figure 4:
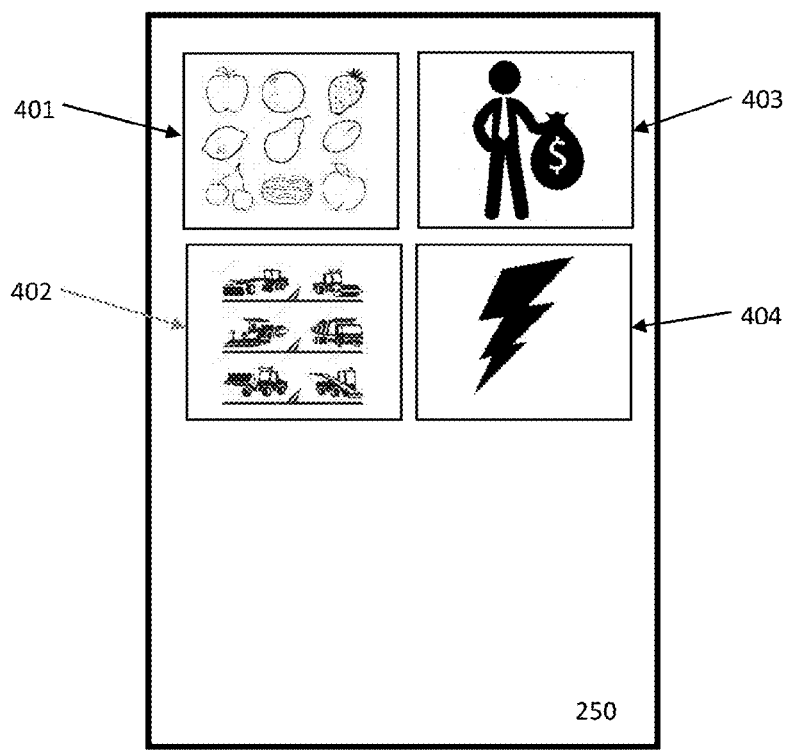
FIG. 4 exemplarily shows a second User Interface (UI) for the landing page showing multiple available applications.

For example, if it is determined by the interface design determination circuit 103 that a user never selects icons 303 and 305 of FIG. 3 and that the users cognition level does not allow for comprehension that icon 304 indicates "debt visualization" and icon 302 indicates "civil services", the design updating circuit 104 will update the display 250 as shown in FIG. 4.

That is, in FIG. 4, icon 402 represents a different pictorial representation for "civil services" and icon 403 is a different pictorial representation for "debt visualization". Also, icons 303 and 305 were removed from the UI of FIG. 4 by the design updating circuit 104. Icons 401 and 404 were kept because it was determined by the cognitive level estimation circuit 102 that the cognition level of the user was above a predetermined threshold such that the user could utilize the functionality behind icons 401 and 404.

In other words, the illiteracy system 100 continuously updates the initial display page of the display 250 of the adaptive user interface 120 based on a cognition level of the user. In this manner, the illiteracy system 100 learns and selects a suitable user interface from a pool of designs by interacting iteratively with the user such that the illiteracy system 100 is universal regardless of a region it is utilized in or of the user since the system 100 adapts based on the user.

Further, the illiteracy system 100 iteratively determines the most suitable user interface for each of the functionalities of the icons.

Figure 5:
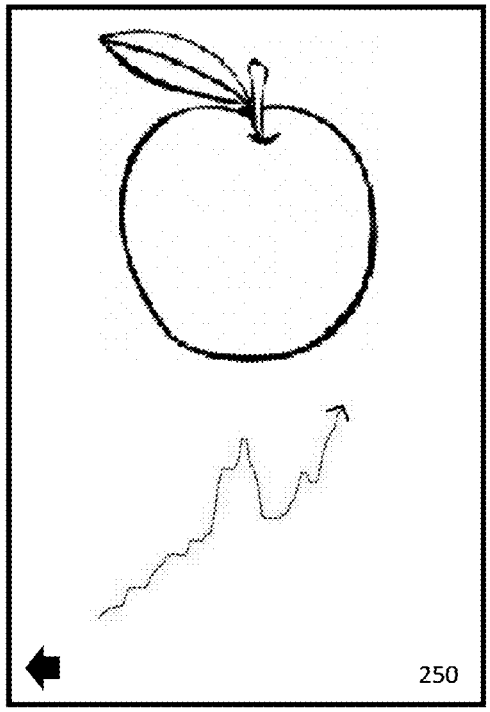
FIG. 5 exemplarily shows a first UI showing the trend of the price for a single product in each page.

For example, FIG. 5 shows a first UI showing the trend of the price for a single product in each page based on the user selecting icon 301. As can be seen from FIG. 5, the display 250 displays a picture of a specific product and shows an indicator (i.e., the line) steadily increasing to indicate that the price for that product is increasing.

If the cognitive level estimation circuit 102 determines that the user cannot understand this pictorial representation based on the cognition level or if the user constantly disregards this pictorial representation for a different representation, then the design updating circuit 104 will update the display 250 such that a different pictorial representation is shown.

Figure 6:
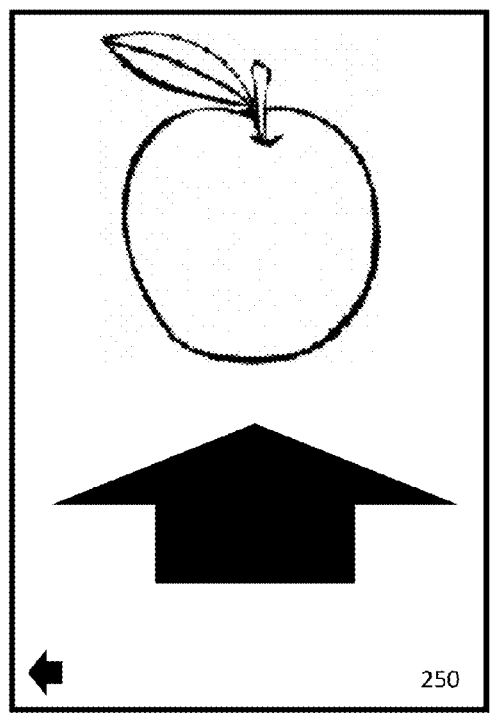
FIG. 6 exemplarily shows a second UI showing the trend of the price for a single product in each page.

That is, FIG. 6 shows a second UI showing the trend of the price for a single product in each page. FIG. 6 utilizes a different pictorial representation for the same indication as FIG. 5 (i.e., a large arrow pointing up). The user may be able to understand this representation better based on the cognition level of the user. The database 150 can include a plurality of designs showing different pictorial representations for the same data. The interface design determination circuit 103 iteratively determines which design can be best for the user based on the cognition level.

Further, the user can "swipe" or switch between different pictorial representations of the same data. The pattern detection and evaluation circuit 101 detects and evaluates which display the user ends up using. If the user continuously "swipes" to the same design, the design updating circuit 104 will force the adaptive interface device 120 to display that particular design first when a user selects an icon.

Figure 7:
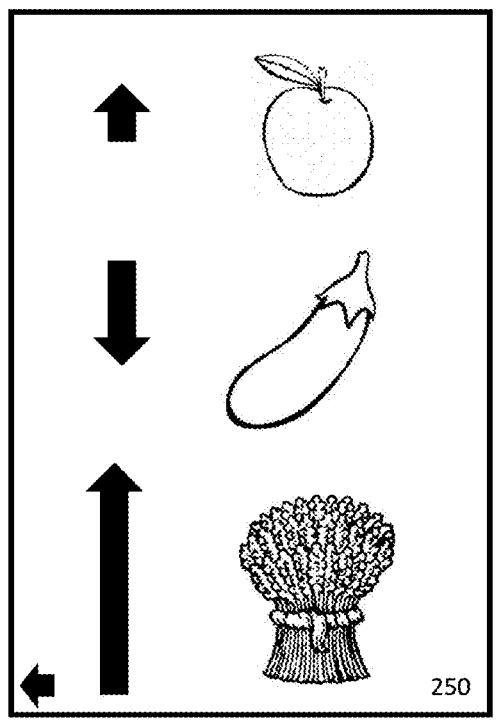
FIG. 7 exemplarily shows a first UI showing the trend of the price for multiple products on a single each page.
Figure 8:
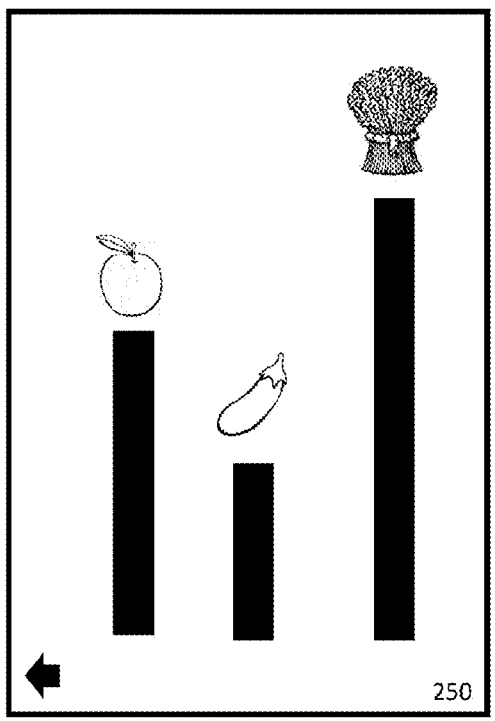
FIG. 8 exemplarily shows a second UI showing the trend of the price for multiple products on a single each page.
Figure 9:
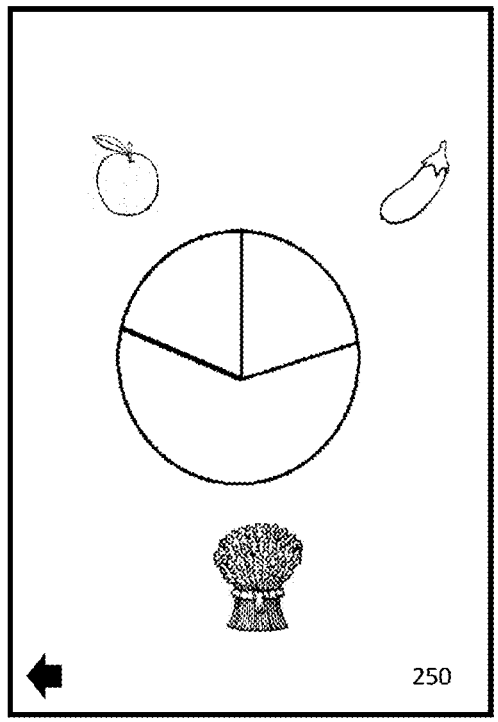
FIG. 9 exemplarily shows a third UI showing the trend of the price for multiple products on a single each page.

For example, FIG. 7, FIG. 8, and FIG. 9 each depict the prices of multiple products on a single display. The user may be able to understand the display using bars in FIG. 8 better than the arrows showing increase price of FIG. 7. Thus, the user would swipe to FIG. 8 after selecting icon 301. Accordingly, the pattern detection and evaluation circuit 101 would detect this pattern, the cognitive level estimation circuit would estimate the cognitive level of the user based on the rejected designs and the selected designs, and then the design updating circuit 104 would update the adaptive interface device 120 to display the display of FIG. 8 first instead of the display of FIG. 7 when the user selects icon 301 of FIG. 3.

Figure 10:
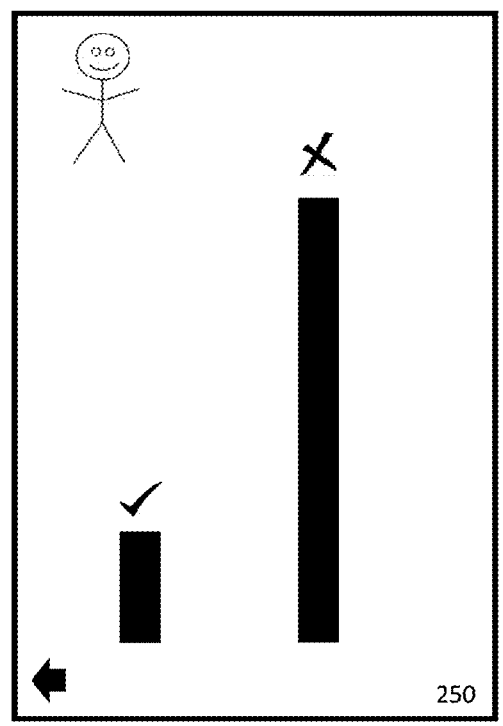
FIG. 10 exemplarily shows a first UI for loan monitoring showing a user an amount of debt paid versus amount of debt owed.
Figure 11:
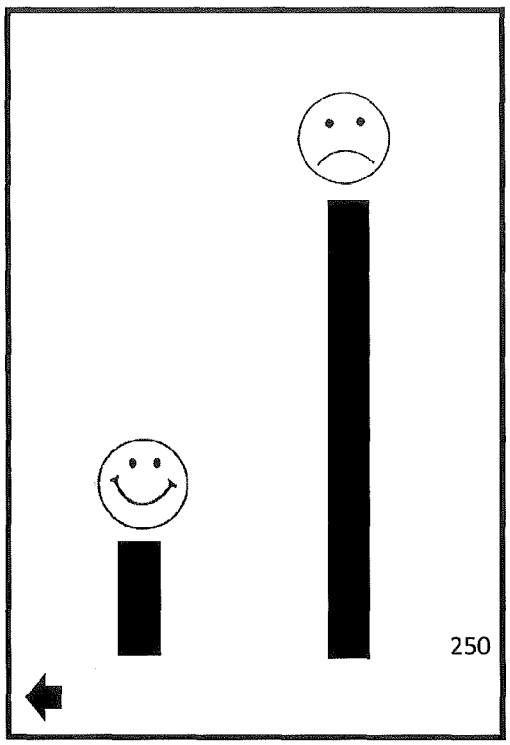
FIG. 11 exemplarily shows a second UI for loan monitoring showing a user an amount of debt paid versus amount of debt owed.

Similarly, FIG. 10, FIG. 11, and FIG. 12 each depict a sub-display of icon 304. The user may understand a particular display over another display. Based on these results, the illiteracy system 100 is able to output a display to the user that the user will understand.

In this manner, not only is the initial user interface updated iteratively based on user interaction, but each sub-display is tailored specifically to each user based on the user's actions. Accordingly, the illiteracy system 100 enables individualization.

Figure 2:
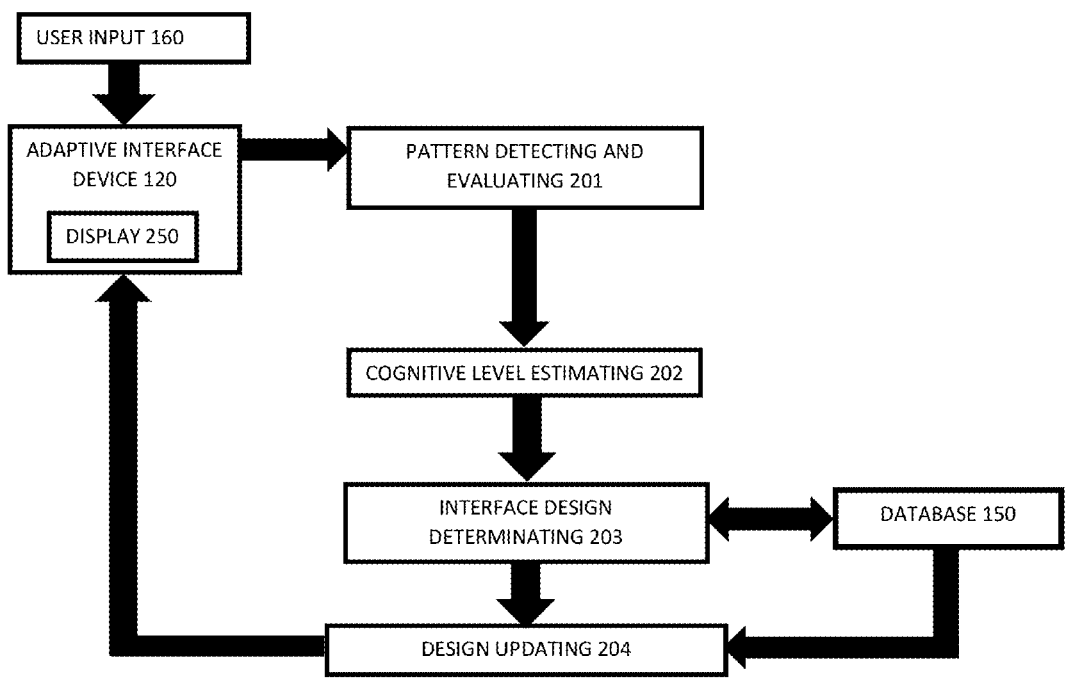
FIG. 2 exemplarily shows a high level flow chart for an illiteracy method.

FIG. 2 shows a high level flow chart for an illiteracy method 200.

Step 201 detects a pattern and evaluates the pattern detected based on a user input into an adaptive interface device 120.

Step 202 estimates a cognition level of the user. That is, step 202 performs an evaluation of what the user is able to understand. In other words, tendency to select a specific icon, or even the number of times the user could use specific features of the system correctly (e.g., correctly report civic concerns to the authority or correctly call emergency services), are used to determine the user's ability to understand (i.e., cognition level) the interface of the display 250.

Step 203 determines which design out of the pool of available designs stored in the database 150 have been most successful, or, which design out of the pool of available designs stored in the database 150 would be most successful if the display 250 was updated according to the cognition level and the evaluated patterns.

According to the design of the pool of available designs in the database 150 determined to be best for the user, Step 204 updates the display 250 of the adaptive interface device 120 to display a better design for the user based on the cognition level.

Thus, the adaptive application using the system, method, and recording medium herein that is tailored for illiterates can provide a higher penetration to less-developed societies. Such application will have a higher capacity to avoid frustrations in the individuals when working with the device. It can also engage the user more actively by being sufficiently challenging, yet not crossing the edge. The adaptation component manifests the benefits when the designers and developers do not have sufficient knowledge about the potential users and yet, the application is intended for mass deployment in unknown societies Exemplary Hardware Aspects, Using a Cloud Computing Environment It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 12, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form, of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 13, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the illiteracy system 100 and the illiteracy system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An illiteracy system for receiving a user input via an adaptive interface device including a display, the illiteracy system comprising:
a pattern detection and evaluation circuit configured to detect and evaluate a pattern of the user input selections of an icon of a plurality of icons on a main-display interface of the display;
a cognitive level estimation circuit configured to estimate a cognitive level of a user based on the pattern;
an interface design determination circuit configured to determine an interface design out of a plurality of interface designs stored in a database that results in a highest value of the cognitive level of the user; and
a design updating circuit configured to update the main-display interface according to the interface design having the highest value of the cognitive level of the user wherein the design updating circuit updates the main-display interface to represent a function in a society with a plurality of pictorial representations for the function, and the plurality of pictorial representations are displayed to the user differently for representing the function.

2. The system of claim 1, wherein the cognitive level estimation circuit iteratively estimates the cognitive level of the user based on the pattern.

3. The system of claim 1, wherein the design updating circuit updates the main-display interface to remove icons from the display in which the cognitive level of the user for the icons is less than a predetermined threshold value.

4. The system of claim 1, wherein the plurality of interface designs stored in the database include the plurality of different pictorial representations for a same icon.

5. The system of claim 1, wherein the plurality of interface designs stored in the database include a plurality of different pictorial representations for a same icon such that the interface design determination circuit determines a pictorial representation of the same icon that has a highest cognitive level for the user.

6. The system of claim 1, wherein each icon includes a plurality of sub-display interfaces associated with the icon.

7. The system of claim 6, wherein the pattern detection and evaluation circuit is further configured to detect and evaluate a pattern of the user input selecting a sub-display interface of the plurality of sub-display interfaces, and
wherein the interface design determination circuit determines the sub-display interface that has a highest cognitive value for the user such that the design updating circuit updates the display to display the sub-display interface that has the highest cognitive value first when the icon is selected.

8. The system of claim 6, wherein the sub-display interfaces are each pictorially different from each other so as to allow the user to determine which of the sub-display interfaces is understandable by selecting a particular sub-display interface of the sub-display interfaces.

9. The system of claim 6, wherein the design updating circuit updates the sub-display interfaces such that a sub-display interface having a highest cognitive value to the user is displayed first when the icon is selected.

10. The system of claim 6, wherein the design updating circuit iteratively updates the icons of the main-display interface and the sub-display interfaces associated with the icons based on the estimated cognitive level of the user.

11. An illiteracy method for receiving a user input via an adaptive interface device including a display, the illiteracy method comprising:
detecting and evaluating a pattern of the user input selections of an icon of a plurality of icons on a main-display interface of the display;
estimating a cognitive level of a user based on the pattern;
determining an interface design out of a plurality of interface designs stored in a database that results in a highest value of the cognitive level of the user; and
updating the main-display interface according to the interface design having the highest value of the cognitive level of the user,
wherein the updating updates the main-display interface to represent a function in a society with a plurality of pictorial representations for the function, and the plurality of pictorial representations are displayed to the user differently for representing the function.

12. The method of claim 11, wherein the plurality of interface designs stored in the database include the plurality of different pictorial representations for a same icon.

13. The method of claim 11, wherein each icon includes a plurality of sub-display interfaces associated with the icon.

14. The method of claim 13, wherein detecting and evaluating is further configured to detect and evaluate a pattern of the user input selecting a sub-display interface of the plurality of sub-display interfaces, and wherein the determining determines the sub-display interface that has a highest cognitive value for the user such that the updating updates the display to display the sub-display interface that has the highest cognitive value first when the icon is selected.

15. The system of claim 6, wherein the sub-display interfaces are each pictorially different from each other so as to allow the user to determine which of the sub-display interfaces is understandable by selecting a particular sub-display interface of the sub-display interfaces.

16. A non-transitory computer-readable recording medium recording an illiteracy program for receiving a user input via an adaptive interface device including a display, the program causing a computer to perform:

detecting and evaluating a pattern of the user input selections of an icon of a plurality of icons on a main-display interface of the display;

estimating a cognitive level of a user based on the pattern;

determining an interface design out of a plurality of interface designs stored in a database that results in a highest value of the cognitive level of the user; and updating the main-display interface according to the interface design having the highest value of the cognitive level of the user, wherein the updating updates the main-display interface to represent a function in a society with a plurality of pictorial representations for the function, and the plurality of pictorial representations are displayed to the user differently for representing the function.

17. The non-transitory computer-readable recording medium of claim 16, wherein the plurality of interface designs stored in the database include a plurality of different pictorial representations for a same icon.

18. The non-transitory computer-readable recording medium of claim 16, wherein each icon includes a plurality of sub-display interfaces associated with the icon.

19. The non-transitory computer-readable recording medium of claim 16, wherein detecting and evaluating is further configured to detect and evaluate a pattern of the user input selecting a sub-display interface of the plurality of sub-display interfaces, and wherein the determining determines the sub-display interface that has a highest cognitive value for the user such that the updating updates the display to display the sub-display interface that has the highest cognitive value first when the icon is selected.

20. The non-transitory computer-readable recording medium of claim 16, wherein the sub-display interfaces are each pictorially different from each other so as to allow the user to determine which of the sub-display interfaces is understandable by selecting a particular sub-display interface of the sub-display interfaces.

* * * * *